United States Patent [19]

de Mimerand et al.

[11] 4,303,503
[45] Dec. 1, 1981

[54] MACHINE FOR SORTING ARTICLES

[75] Inventors: Yvan de R. de Mimerand; Jean Goullet, both of Paris, France

[73] Assignee: Hotchkiss-Brandt Sogeme H.B.S., Paris, France

[21] Appl. No.: 921,225

[22] Filed: Jun. 30, 1978

[30] Foreign Application Priority Data

Jul. 5, 1977 [FR] France ................. 77 20658

[51] Int. Cl.³ .................. B07C 5/36; B65G 47/49
[52] U.S. Cl. ..................... 209/3.3; 198/370; 198/473; 209/583; 209/912; 209/922
[58] Field of Search ................ 209/3.1, 3.3, 583, 584, 209/900, 912, 922; 198/473, 477; 414/136, 13; 198/349, 362, 370, 482, 492, 678

[56] References Cited

U.S. PATENT DOCUMENTS

| 1,412,631 | 4/1922 | Righter | 209/3.3 |
|---|---|---|---|
| 1,808,406 | 6/1931 | Gammell | 209/3.3 |
| 3,612,250 | 10/1971 | Thompson et al. | 209/3.3 |
| 3,627,153 | 12/1971 | Brummett et al. | 198/349 X |
| 3,785,474 | 1/1974 | Nakamoto | 198/678 X |
| 3,799,318 | 3/1974 | Dekoekkoek | 198/477 X |
| 4,058,217 | 11/1977 | Vaughan et al. | 209/583 X |

Primary Examiner—Robert J. Spar
Assistant Examiner—Edward M. Wacyra
Attorney, Agent, or Firm—Cushman, Darby & Cushman

[57] ABSTRACT

A machine for sorting articles carried by clips comprises suitable systems which are responsible for disengaging and engaging the clips "on the fly" from and on fixed and moving supports, which cooperate with transfer systems to convey the articles from a work station situated upstream of the machine to a series of receiving rods each corresponding to a given address. The articles are thus directed towards the receiving rods to be engaged on them as dictated by their final destinations.

4 Claims, 16 Drawing Figures

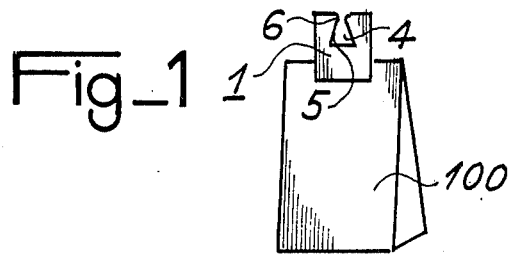
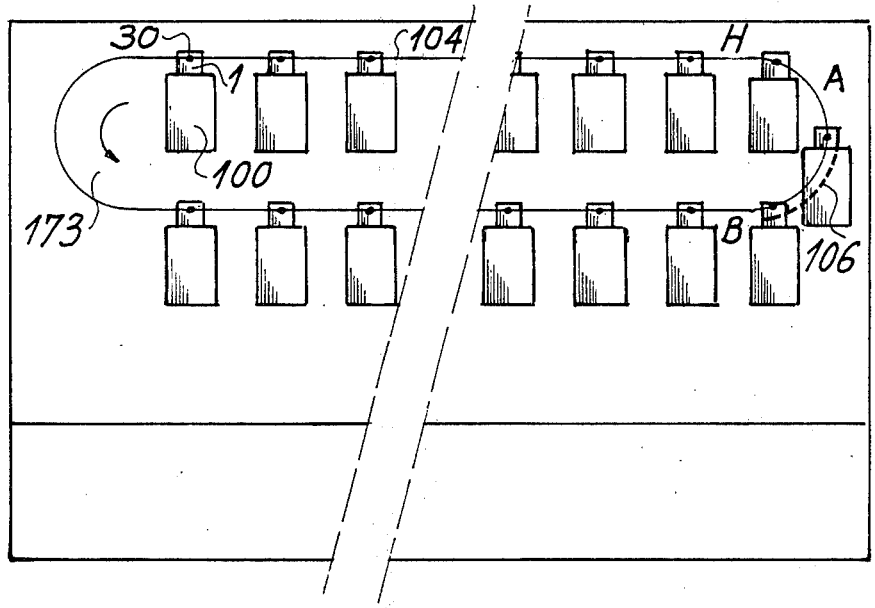
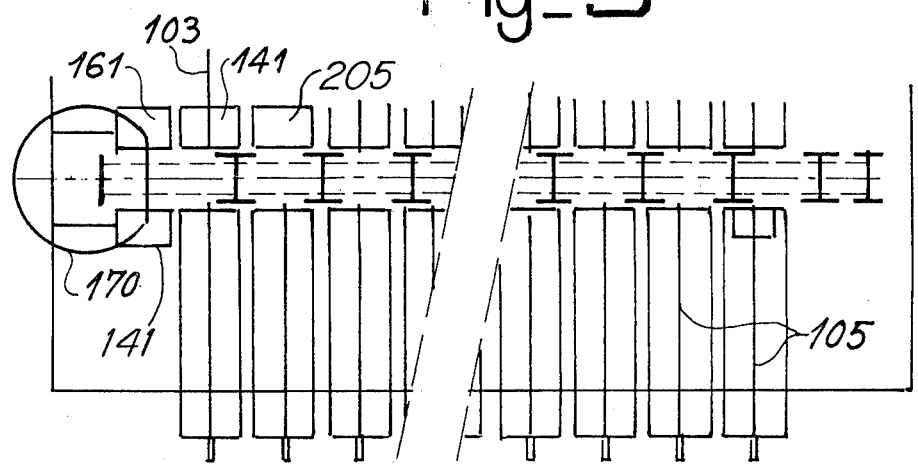

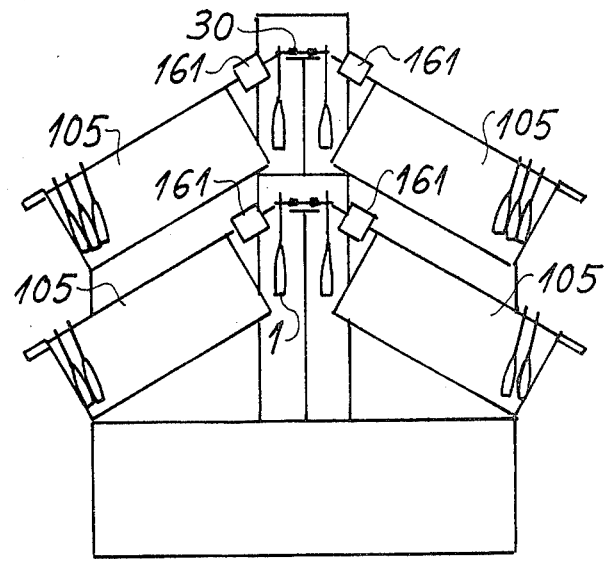
Fig_4
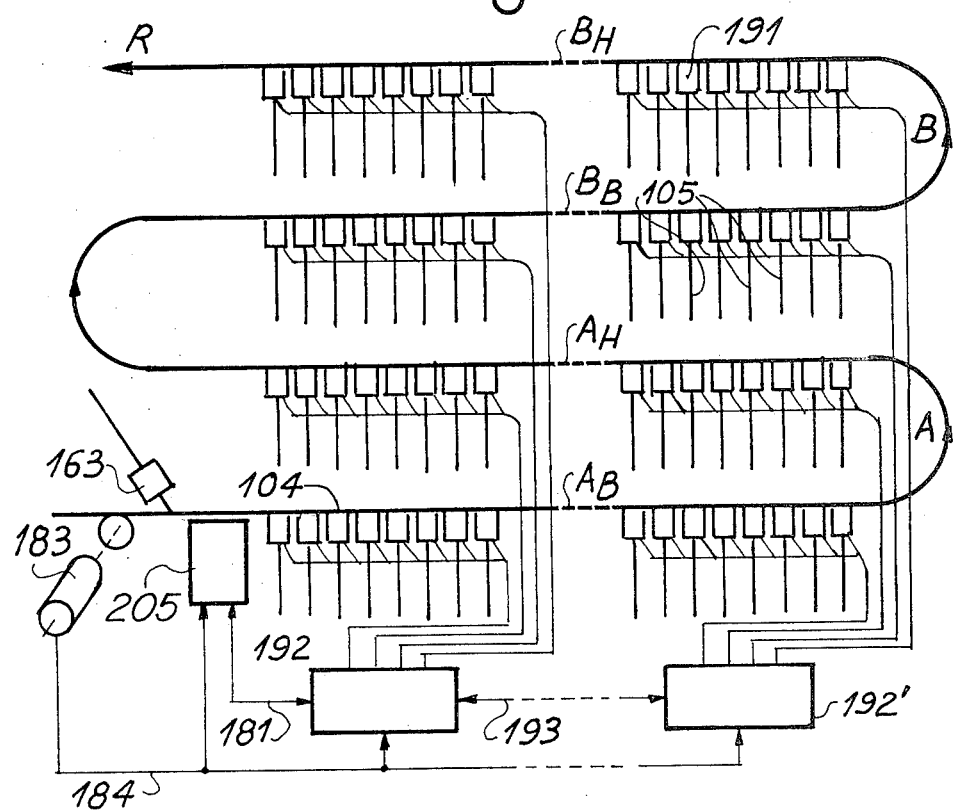
Fig_5

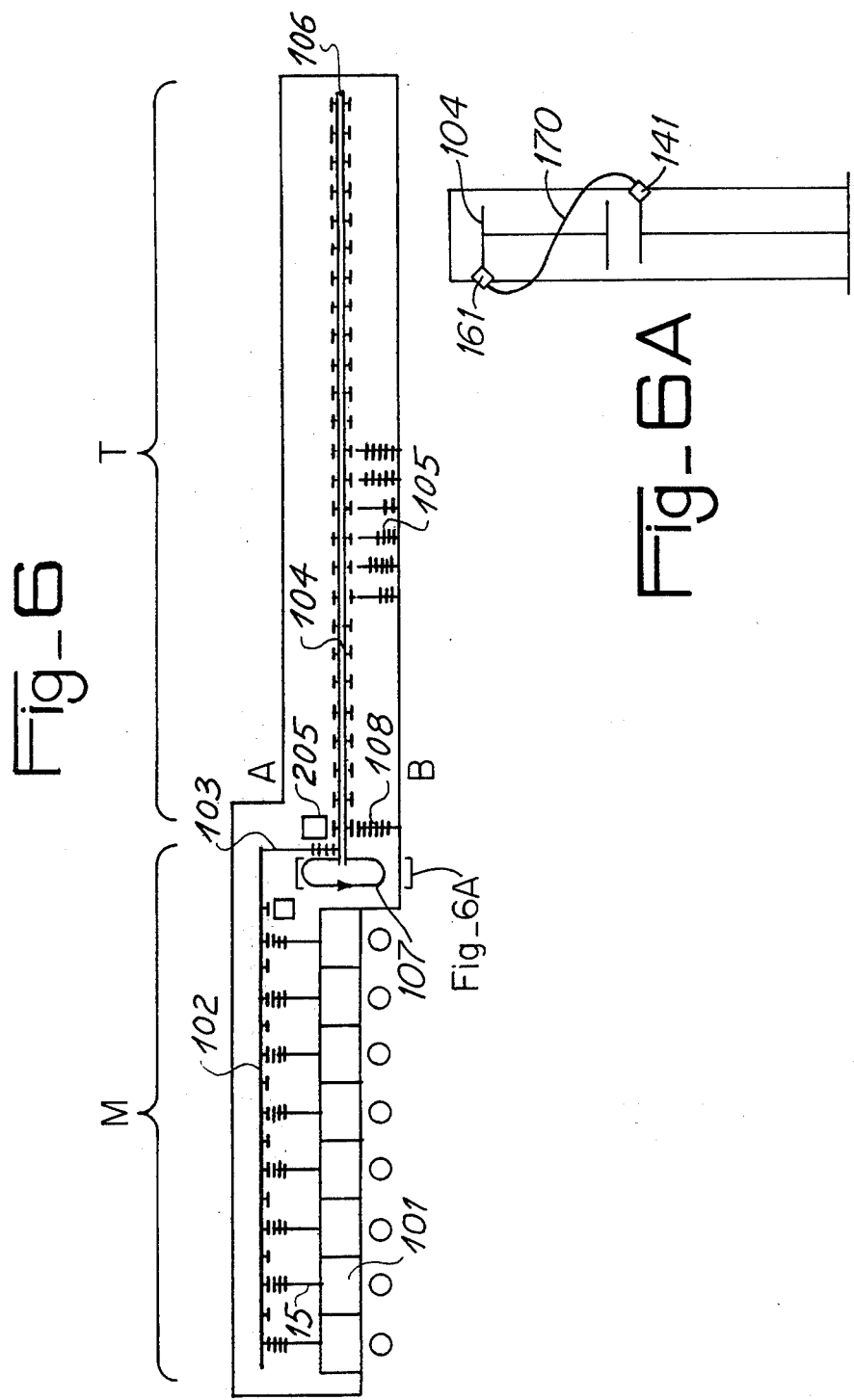

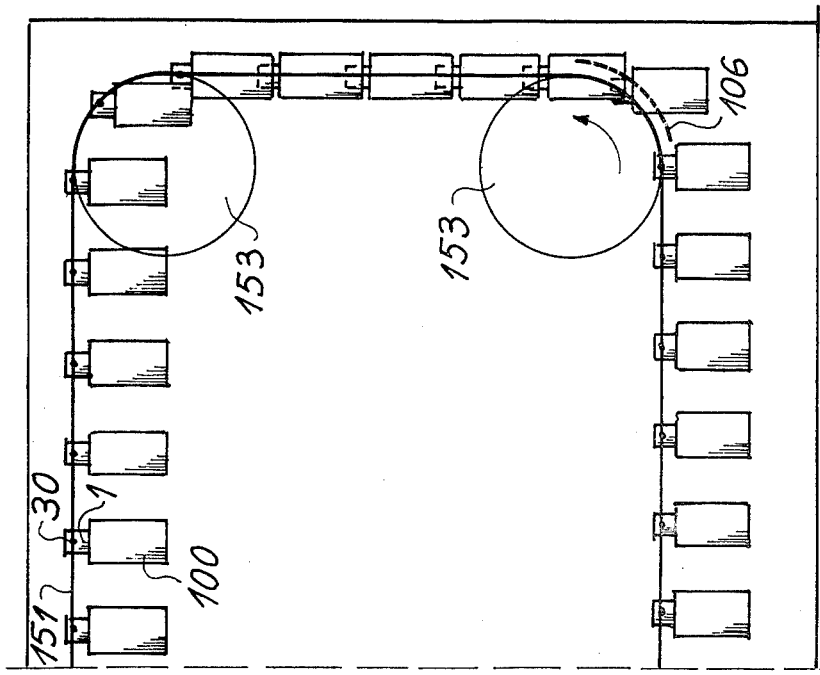
Fig_8
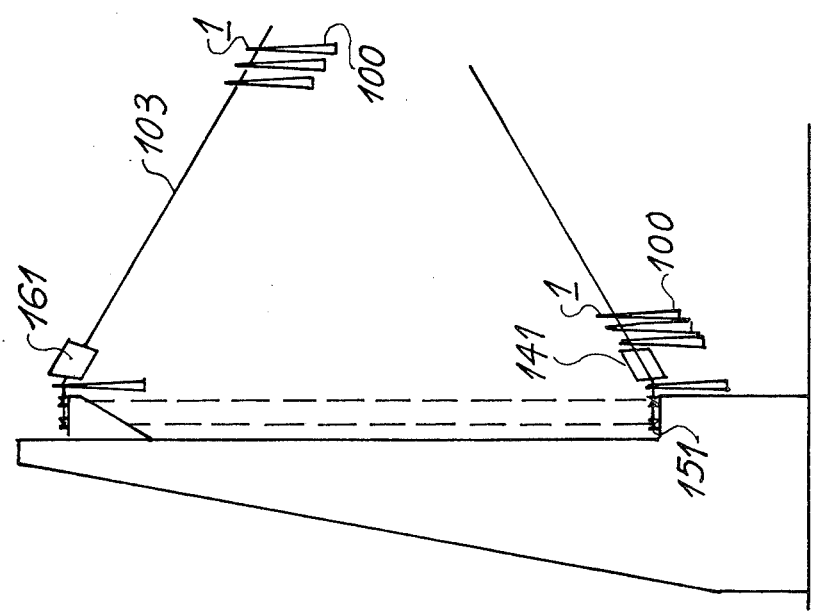
Fig_7

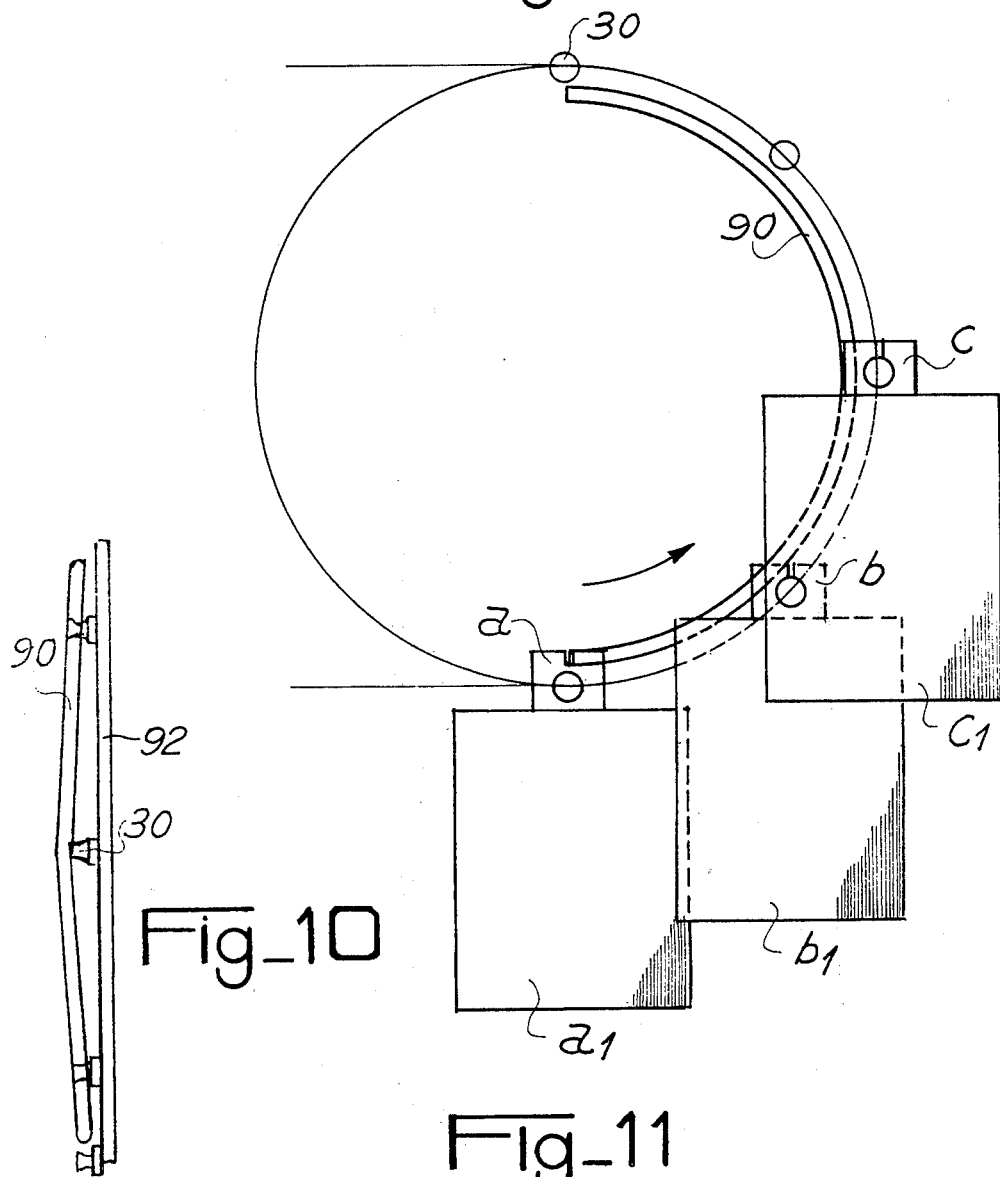
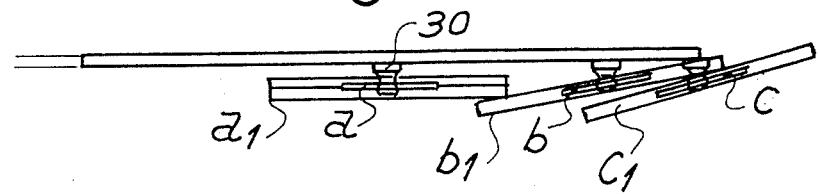

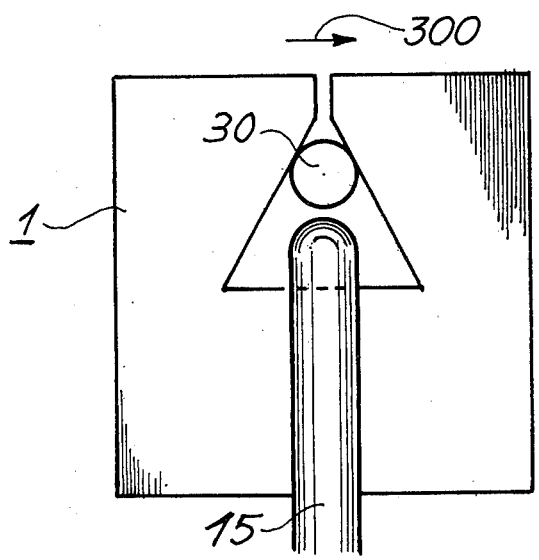
Fig_14
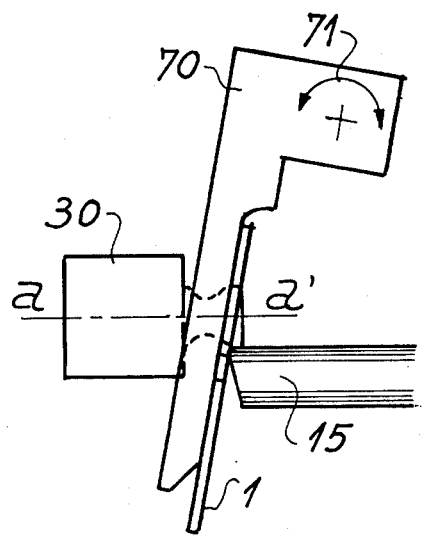
Fig_15
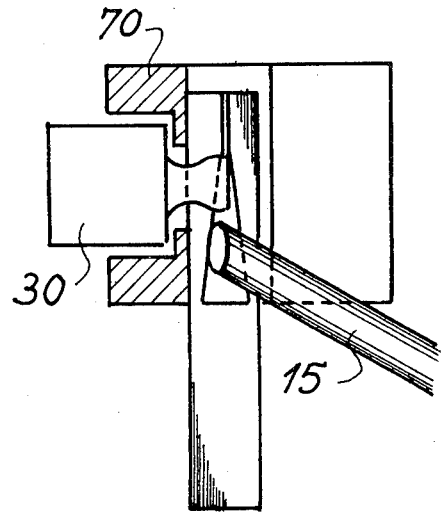
Fig_16

MACHINE FOR SORTING ARTICLES

The present invention relates to a machine for sorting articles and in particular to a machine of this kind specially adapted to sort articles carried by clips, which clips are capable of being disengaged from a fixed support and engaged on a moving support and vice versa. The fact of using clips to provide a connection between the articles to be sorted and the moving or fixed supports has major advantages provided the clips are easy to handle and give every assurance of reliable operation. The object of the present invention is to ensure that these conditions are precisely met. The invention relates to a machine for sorting articles each carrying an address indicator marking and each carried by a clip which acts as a connection between the article which it carries and a fixed or moving support, said machine comprising a so-called intermediate storage rod which is intended to receive articles coming from work stations situated upstream of the sorting machine; a series of moving supports in the form of lugs which are set in motion by a transfer device; at least one extracting and engaging member which is capable of extracting the clips one by one and engaging them on one of the said lugs; a series of fixed supports or receiving rods equal in number to the number of possible addresses for the said articles; at least one disengaging member capable of disengaging the clip from the moving lug and engaging it on the receiving rod corresponding to the destination of the article carried by the clip as soon as the positions of the lug and of this rod coinside.

The invention will be better understood from the following explanation and the accompanying Figures, in which:

FIG. 1 shows an article, in the form of a pouch carried by a clip,

FIGS. 2, 3 and 4 are schematic views from various directions of the principal parts of a machine for sorting articles carried by clips according to the invention, FIG. 5 enables the operation of a sorting machine according to the invention to be better understood, FIG. 6 shows the general lay-out of an installation incorporating a sorting machine according to the invention.

FIG. 6A is a schematic representation of the helical rod, engaging and disenaging members and transfer chain of the present invention, bracketed in FIG. 6.

Figure 12:
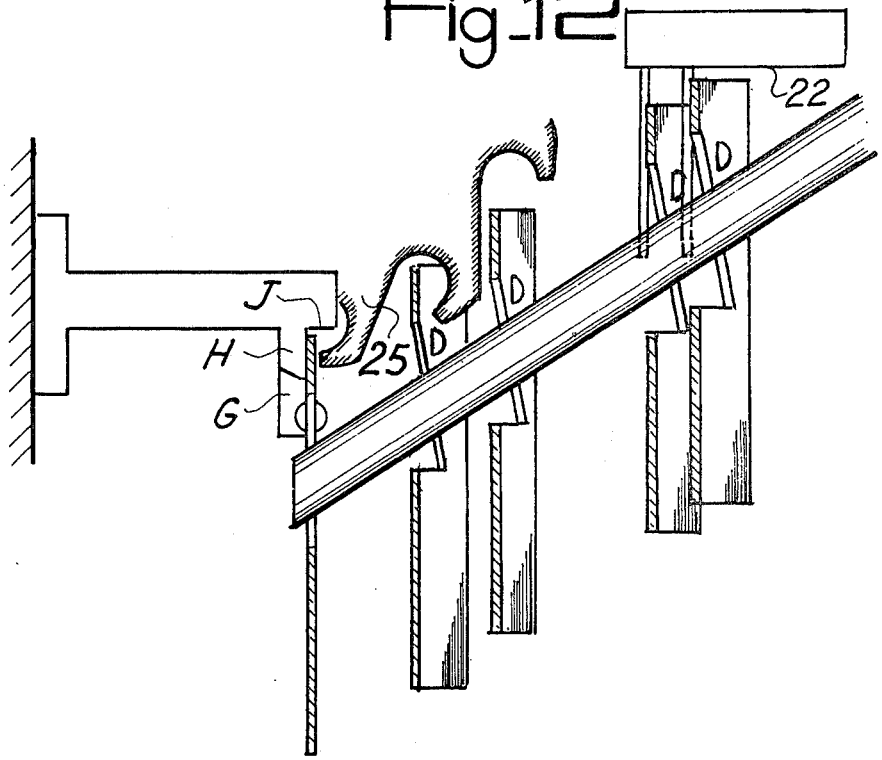
Figure 13:
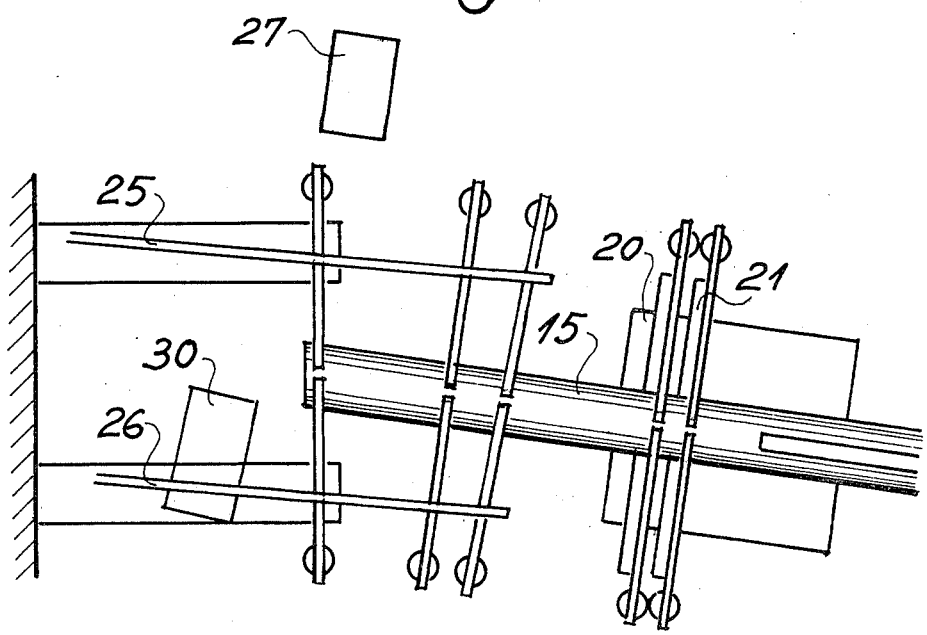

FIGS. 7 and 8 show the chief parts of a handling system capable of co-operating with a sorting machine according to the invention, FIGS. 9, 10 and 11 are views from different directions of an embodiment of a member for overlapping the articles, FIGS. 12 and 13 are views from different directions of an embodiment of a member for extracting and engaging clips, FIGS. 14, 15 and 16 are views from different directions of a member for disengaging the clips.

The present invention thus relates to a sorting machine capable of receiving articles to be sorted, which are each carried by a clip, and of directing them to their final destination. Before such a sorting machine is described, it would first of all be advisable to consider the kind of clip which is best suited to co-operating with the combination of means employed in the machine according to the invention. As is shown in FIG. 1, each article 100 is carried by a clip 1 which is preferably of the kind described hereinafter. The clip concerned acts as a connection between the article (a pouch in the present case) and a fixed or moving support. It is characterised by the combination which is arrived at between the material selected to produce it and the special configuration with which the clip is endowed to enable it to be engaged and disengaged, and possibly to enable a plurality of clips to be overlapped, which operations are able to be performed under the most difficult conditions, i.e. even if they have to be performed automatically on the fly. A clip 1 of this nature, which carries an article 100 such as a pouch as shown in FIG. 1, contains an opening 4 which passes entirely through the clip and which is of an outline shape 5 which leaves an open slot 6 preferably in the middle of the upper side of the clip. The outline shape of this opening is extremely important. In effect, it assists in the performance of at least two essential functions. On the one hand it defines an opening which is sufficiently large to allow a support to enter it easily even if the clip and the support are subject to pronounced movement relative to one another (an operation performed on the fly). On the other hand, it must result in a wall configuration which assists the clip to slide on its support until a state of equilibrium is reached. A progressively changing outline which defines a decreasing area from the slot to the base of the opening meets this requirement and it is for this reason that the triangular outline shape shown in FIG. 1 for the opening 4 is particularly suitable for the performance of these two functions. In effect, the base of the triangle may be selected to suit the intended application and may thus ensure that the conditions required to allow the first function to be performed are met (the entry of the support on the fly). Allowance is made in each case for the dimensions of the support. The sides of the triangle which form the walls of the opening have an inclination which is similarly adaptable to the intended application and which is capable of promoting the sliding mentioned above. The apex of the triangle coincides with the slot 6, whose cross-sectional area is less than that of the support. The slot defines two parts situated on either side of a plane which passes, for example, through the axis of the slot. Because of the presence of the slot, the two parts may be shifted away from this plane in opposite directions from one another, thus leaving an open space which assists in disengaging the clip. However, if this is to be done properly, and it is here that the nature of the material comes into play, it is first of all necessary for the material to have a sufficiently high co-efficient of elasticity for the deformation not to be permanent, given the thickness of the clip, the clip then returning automatically to its initial shape at the end of the disengaging operation by spring action. However, it is also necessary for the material to have a low coefficient of friction so as not to prevent the clip from sliding and indeed to promote this sliding. There are on the market plastics materials which meet these requirements and which are easy to make use of by injection, stamping or moulding. Bosses may be provided on the clips. The bosses then serve as spacers in cases where a series of clips is used and a predetermined distance must be maintained between the clips.

As shown in FIGS. 2, 3 and 4, a sorting machine according to the invention is formed on the one hand by a device which provides for the infeed of the pouches 100, carried by their clips 1, into the sorting machine, this device taking the form of a storage rod 103 termed an intermediate rod onto which the pouches have been threaded by any manual or automatic handling means, and on the other hand by a transfer device 104 which is formed by a chain and which is provided with lugs 30 on at least one side, but preferably on both sides. Motor-driven pulleys 173 are responsible for the movement of the chain 104 and the change of level from B to H.

Two overlap devices such as 106 prevent the pouches from becoming entangled at the time of changing level. Extracting and engaging members 141 are responsible for extracting the pouches stored on the intermediate rod 103 one by one and engaging them on the lugs 30 of the chain 104. A series of receiving rods 105 equal in number to the possible sorting directions is provided. When a clip carrying an article, whose address has previously been read by a suitable reading means 205, presents itself in front of the receiving rod corresponding to its destination, an order is given to a disengaging member 161 to disengage the said clip and to allow it to be inserted on the receiving rod for which the article which it carries is intended.

To increase the sorting capacity of the machine without thereby causing an excessive increase in its size, a provision may be made which forms a feature of the invention. In this case, the receiving rods 105 are arranged in such a way that they are situated on both the high and low levels (H and B) at both the front and rear faces of the machines. A level changing device 106 or overlapping device and a face changing device are then provided and enable a sorting machine constructed to the design to operate correctly. Referring to FIG. 3, the face changing device comprises a helical rod 170, a fixed disengaging member 161 at the top end of helical rod 170, and a member 141 disposed at the bottom end of helical rod 170 for engaging the bags from rod 170 on lugs 30 of the transfer chain situated on the rear face. Thus, as is most clearly shown in FIG. 3 and FIG. 6A, a clip having arrived at member 161 at the upper level at the front face of the machine is disengaged from lug 30 by member 161 and onto helical rod 170, slides along helical rod 170 to the rear lower level at member 141 which engages the clip onto the lug 30 on the rear face at the lower level. The final receiving rod 108 at the upper level of the rear face, on which are engaged those bags which have not been dispatched to an address by reason of, inter alia, reading or addressing errors, represents a reject direction.

FIG. 5 enables the operation of a sorting machine according to the invention to be better understood. The pouches are followed individually from the reading head 205. The loss of a pouch when being engaged or disengaged when changing faces results in the machine stopping and starting again after an operator has taken some action. A logic control device 163 is responsible for dispensing pouches onto the lugs 30 of the transfer chain 104. A timer 183 is responsible for synchronising operations. Each advance of the chain by one step corresponds to one pulse from the timer along a line 184. The step is made such as to ensure that the timer frequency is compatible with the control device and is sufficiently accurate to allow engagement and disengagement to be ordered. The reading head 205 reads the indicator codes carried by the pouches and translates them into the addresses of receiving rod 105. A connecting circuit 181 transmits these addresses to a logic circuit 192 which monitors the progress of the articles and which supplies a logic switching unit(s) 191 with an order to disengage the pouches when they have arrived at their destination. Connecting circuits 193 are responsible for transmitting the addresses of pouches which pass from a transfer zone monitored by one logic circuit 192 to another transfer zone monitored by another logic circuit 192'. The articles progress in the direction indicated by the arrows from the front face A whilst passing from a low level AB to a high level AH (via overlap device 106), then to the rear face B (at lower level BB via helical rod 170) and similarly from a low level BB to a high level BH (via overlap device 106). Articles which have not been directed onto a receiving rod are fed away in a reject direction R.

A sorting machine according to the invention may be applied in any installation for handling articles in which there is at least one sorting operation, no matter what are the operations performed upstream and downstream of the sorting area.

To give a better illustration of the invention, an application of the sorting machine will now be described. The installation concerned is intended to sort pouches of photographs after invoicing. A laboratory processes the photographs, which come to it from various sources and in particular retailers (chemists, tobacconists and photographers) who act as middlemen to the public. The films are placed in a standard pouch on which is printed information in code and/or in clear, as well as information relating to the customer's requirements. These pouches are picked up by a collection service at a frequency which varies depending upon the size of the retailer and/or the laboratory.

When the pouches reach the laboratory, they are emptied of their contents, which are introduced into the processing cycle with suitable identification. At the end of the cycle the photos are reunited with their original pouch. Automatic reading of the fixed data, plus the insertion of the data specific to the client, produce the data required for invoicing. It will be appreciated that at this moment the pouches will no longer be in their original order and that they have to be sorted so that they can be put on the vehicle which services the appropriate delivery round. The pouches have attached to them clips such as were described above with reference to FIG. 1.

FIGS. 6 and 7 illustrate the general lay-out of an installation according to the invention which is particularly adapted for sorting pouches of photographs after invoicing. As was stated above, an installation of this kind is equally suitable for any application involving at least one sorting operation, no matter what the nature of the work stations situated upstream and downstream of the sorting machine proper. An installation of this kind is formed in essence by a sorting machine T of the kind described above and a handling system M which is responsible for taking the articles from a work station (the invoicing stations in the embodiment being described) and feeding them onto the sorting machine proper.

The pouches 100, provided with their clips 1 and bearing an address indicator marking, are fed to the invoicing stations by handling means of any suitable kind which, since they are not part of the present invention, are not described. The invoicing stations print an invoice for the client who has sent in the order for the photographs. The pouches are dealt with, one by one, by one or more operators who perform the invoicing operations and then engage the pouches on storage rods 15 positioned in front of them. The pouches are extracted one by one to be engaged, by means of an engaging member 141, on a first transfer device 102 which conveys them to an intermediate rod 103 which provides a connection between the transfer device and the sorting machine proper. A disengaging member is responsible for inserting the wallets on the intermediate rod 103. They are then again extracted one by one from the intermediate rod 103 and are engaged on a second transfer device which forms part of the sorting machine. They pass in front of an indicator recognising device 205 which acts on disengaging means capable of threading the pouches onto receiving rods 105. Each address has a specific receiving rod corresponding to it. Wrongly addressed articles are conveyed to a reject rod 108.

When one of the receiving rods is full, its contents are discharged into a handling box and the latter are then grouped together in batches for dispatch by handling means which form no part of the present invention.

Again present are the principal items and members which were described when describing the sorting machine proper. Embodiments of the principal members, for overlapping (106), engaging (141) and disengaging (161) which are used both in the handling zone M and in the sorting zone (the sorting machine T and its ancillaries) will not be described.

As is shown in FIG. 8, the handling device is formed by a chain 151, for example of the same kind as is fitted to the transfer device of the sorting machine proper, the front face of which is provided with lugs such as 30 which are able to carry pouches 100 via clips 1.

Motor driven pulleys 153 are responsible for moving the chain 151. A device 106 for overlapping the pouches on the curves enables them to travel from a lower level to a high level (or vice versa).

The direction of movement of the articles reverses on each level and the engaging means of the clips must always move in a vertical plane. It is therefore essential to cause the clips and the articles which they are carrying to move one above the other during the rotation of the driving means through 180°. This operation is defined as being an overlapping operation and is performed by means of a so-called overlapping member (reference numeral 106) without causing the articles to move apart to any substantial degree. A member of this kind is described herein after: as is shown in FIGS. 9, 10 and 11, which show respectively partial side, end, and plan views of overlapping member 106, it is formed in essence by a guide 90 concentric with the path of the lugs 30, whose shape is adapted to cause the clips (a), (b) and (c) (carrying their articles $a_1$, $b_1$, $c_1$) to pivot during part of their rotation so that they rotate slightly on their lugs 30, thus ensuring that the articles suspended from the clips can overlap one another.

FIG. 9 illustrates this operation and clearly shows the beginning of the overlap, which becomes more extensive from clip (a) to clip (c). As is shown in FIG. 10, guide 90 bends outwardly from pulley 92 causing clips (a), (b) and (c) to pivot by an increasing amount between the constraints of guide 90 and pulley 92 and then, when the operation has been completed and the articles are practically on top of one another, the guide 90 bends in again to enable the clips to return to the equilibrium position. It should however be mentioned that this operation is easier to perform the flatter are the articles.

The clips, which are extracted from a rod which may be either a storage rod 15 belonging to the handling device M or the intermediate rod 103 which is an ancillary of the sorting machine according to the invention, may be extracted and engaged by means of an engaging member 141. As FIGS. 12 and 13 show, it is principally formed by an individual dispenser which co-operates with the engaging device proper. The dispenser receives the clips, which are situated one behind the other on an inclined rod 15, and the first clip (a) comes into abutment against a second gate 20, a first gate 21 being raised.

The first gate 21 comes down between the first clip (a) and the second clip (b) following it and holds back the second clip (b) when the first clip (a) is released by raising the second gate 20. These two gates are connected by a lever system which in turn is controlled by an electromagnet 22. The alternating movement of the two gates ensures that the clips are dispensed one by one at the requisite time. The "on the fly" engaging device proper, which receives the clips one by one from the rod 15 or 103 concerned, is formed by a thrust member which is responsible for applying the clips to a set of abutments, as will be explained more clearly below. The thrust member may for example be an assembly of two ratchet wheels 25 and 26 of different diameters which have the same number of teeth and which are locked to one and the same shaft, the shaft being inclined to the path of the lugs intended to receive the clips and thus to the axis of the rod. The wheels are driven by a "step-by-step" motor or by any other indexing ratchet system. The shape of the teeth is special in that it is suited to the reception of the clips, and thus the articles, one by one and to thrusting them against the abutments (H and G), which form an angle of less than 90° with the axis of the rod. The result is that the clips occupy an inclined position which is essential if the clips are to be engaged "on the fly" on moving supports such as the lug 30, which can thus enter the triangular opening in the clip and carry the clip away. The clips are held in a substantially vertical position for the duration of the engaging operation by means of an abutment (J) which restricts rotation of the clip in a vertical plane, the effect of which is to prevent the clip from swinging about wildly just after it has been transferred to the lug concerned. The engagement takes place as follows: the lug 30, having entered the triangular opening in the clip, causes the clip to rotate slightly on the rod until abutment (J) halts this rotation. As it continues on its way, the lug causes the edges of the slot in the clip to move apart and the clip escapes both from the end of the rod (15) and from abutment (H), which is shorter than abutment (G). As a result of its resilience, the clip regains its original shape (with the edges of the slot opposite one another) and finds itself suspended on the conveying lug 30. The path of movement of the transfer or handling system is perpendicular to the axis of the rod. The means for controlling the dispenser and the engaging device, which are already synchronised, also need to be synchronised with the passage of an unoccupied lug so that a clip will already be resting against its abutments (H and G) before the unoccupied lug enters the triangular opening in the clip which is to be engaged.

A logic control member, for example, may be provided to prevent a clip from approaching the abutments (H and G) as long as an unoccupied lug has not been reported by a proximity detector. Under these conditions engagement is thus automatic.

Other engagement systems may be used depending upon whether or not the clips are provided with bosses. Once the clips have been engaged on the lugs they are carried along by the chain which carries the lugs.

The disengaging member 161 is shown in FIGS. 14, 15 and 16. The purpose of this system is transfer clips carrying articles automatically from the lugs 30, which are moving in the direction indicated by arrow 300, to a fixed, downwardly inclined receiving rod. This is achieved by means of a cam 70 of forked configuration. The shape of the cam is such that it causes the clips to slide on the hook concerned along its axis at the time when the receiving rod 15 or 105 is opposite the triangular opening in the clip. If the cam is held in a fixed position each clip slides along the straight inclined part of the cam and at the moment the receiving rod is opposite the triangular opening in the clip the curved part of the cam 70 brings the disengaging movement to an abrupt end.

The installation described above may be improved by incorporating other functions. It is in fact possible with such a combination of means to provide for qualitative and quantitative supervision of the pouches and for operations involving following the pouches individually from the point where they enter one of the invoicing stations to the point where they leave the sorting machine in order to prevent any of them from being lost.

The present invention has many applications other than those which have been described. It may be in particular be applied to the automatic storage and withdrawal from store of consumer products such as certain hardware products, and the automatic preparation of individual packets formed by small articles of different kinds. It may also be applied to the automatic filing and location of documents.

The construction of the sorting machine and an installation according to the invention is modular from the mechanical, electrical and electronic points of view, using for example a 32-way module, which allows extreme flexibility at the production stage.

What is claimed is:

1. A machine for sorting articles each carrying an address indicator marking and carried by a clip which acts as a connection between the article which it carries and a fixed or moving support element, said machine comprising: an intermediate storage rod which is intended to receive articles coming from work stations situated upstream of the storing machine; a series of support elements in the form of lugs; a transfer device, having a first and a second end, for carrying said lugs in first and second parallel continuous paths, said paths each having a first high level and a second corresponding low level beneath said first high level; a series of receiving rods equal in number to the number of possible addresses of said articles located along said first and second paths; wherein said machine has two parallel faces including a front face and a rear face and wherein said lugs in and said receiving rods along said first and second paths are arranged at the first high level and second low level, corresponding thereto at said front face of the machine and said rear face of said machine, said machine further comprising at least one extracting and engaging means for extracting the clips one by one from said intermediate storage rod and engaging them one each on a separate one of said lugs on the fly, disengaging means for disengaging on the fly each said clip from the said lugs and engaging each said clip onto the appropriate receiving rod for the article which it is carrying as soon as the respective positions of the lugs on which said clip is being carried and of said appropriate receiving rod coincide; said transfer device first end comprising means for carrying said lugs between one of said second low level and its corresponding first high level and the other of said second low level and it corresponding first high level, said machine further including means, disposed at said first end, for causing the articles carried by said clips on at least one of two said faces to overlap each other as they pass between one of said second low level and its corresponding first high level and the other of said second low level and its corresponding first high level; said overlap means comprising means for pivoting about a vertical axis each said clip on the lug on which it is being carried by engaging each said clip.

2. A machine according to claim 1, further comprising a face-changing device wherein said face-changing device comprises a helical rod, having an upper end and a lower end; means, disposed at said helical rod upper end, for automatically disengaging a clip from the lug which is carrying it at said high level at one of said front and said rear faces of the machine and slidably engaging it on the said helical rod; and extracting and engaging means disposed at said helical rod lower end, for automatically extracting said clip from said helical rod at said lower end and engaging said clip on a fresh lug at the lower level of the other of said front and rear faces of the machine.

3. A machine according to claim 1 further comprising means for reading the address indicator marking and for transmitting the data supplied by the said reading means to said disengaging means for disengaging on the fly each said clip from the said lugs and engaging each said clip on the receiving rod appropriate to the destination of the article which it is carrying.

4. A machine for sorting articles each carrying an address indicator marking and carried by a clip which acts as a connection between the article which it carries and a fixed or moving support element, said machine comprising:

an intermediate storage rod which is intended to receive articles coming from work stations situated upstream of the sorting machine;

a series of support elements in the form of lugs;

a transfer device, having a first end, for carrying said lugs in first and second parallel continuous paths, said paths each having a first high level and a corresponding second low level beneath said first high level;

a series of receiving rods each equal in number to the number of possible addresses of said articles located along said first and second paths;

wherein said machine has two faces including a front face and a rear face and wherein said lugs in and said receiving rods along said first and second paths are arranged at the first high level and the second low level corresponding thereto, at said front face of the machine and said rear face of the machine, said machine further comprising at least one extracting and engaging means for extracting the clips one by one from said intermediate storage rod and engaging them one each on a separate one of said lugs on the fly;

disengaging means for disengaging on the fly each said clip from the said lugs and engaging each said clip onto the appropriate receiving rods for the article which it is carrying as soon as the respective positions of the lug and of said appropriate receiving rod coincide;

said transfer device first end comprising means for carrying said lugs between said first high level and said corresponding second low level to the other of said first high level and corresponding second low level; said machine further including means disposed at said first end, for causing the articles carried by said clips on at least one of said two faces to overlap each other as they pass between one of said first high level and its corresponding second low level; and a face changing device spaced from said first end, comprising:

a helical rod, having an upper end and a lower end;

means, disposed at said helical rod upper end, for automatically disengaging one by one clips carried by lugs at said high level at one of said front and said rear faces of the machine and slidably engaging one by one said clips on the said helical rod; and means, disposed at said helical rod lower end, for automatically extracting said clips one by one from said helical rod at said lower end and engaging said clip on a fresh lug at the lower level of the other of said front and rear faces of the machine.

* * * * *